US011829635B2

(12) United States Patent
Cross et al.

(10) Patent No.: US 11,829,635 B2
(45) Date of Patent: Nov. 28, 2023

(54) MEMORY REPAIR AT AN INFORMATION HANDLING SYSTEM

(71) Applicant: Dell Products L.P., Round Rock, TX (US)

(72) Inventors: Kevin M. Cross, Pflugerville, TX (US); Jordan Chin, Austin, TX (US); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 17/451,714

(22) Filed: Oct. 21, 2021

(65) Prior Publication Data

US 2023/0130808 A1 Apr. 27, 2023

(51) Int. Cl.
G06F 3/06 (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 2017/0200511 | A1* | 7/2017  | Warnes   | G11C 14/0018 |
| 2017/0308447 | A1* | 10/2017 | Wu       | G11C 29/44   |
| 2019/0108892 | A1* | 4/2019  | Berke    | G11C 29/886  |
| 2020/0111539 | A1* | 4/2020  | Yamaguchi| G06F 11/3062 |
| 2020/0133517 | A1* | 4/2020  | Shah     | G06F 11/076  |
| 2020/0185052 | A1* | 6/2020  | Nale     | G11C 11/406  |
| 2021/0034446 | A1* | 2/2021  | Shim     | G06F 11/3034 |
| 2021/0311818 | A1* | 10/2021 | Zimmer   | G11C 29/76   |

* cited by examiner

Primary Examiner — Michael Krofcheck
(74) Attorney, Agent, or Firm — McDermott Will & Emery LLP

(57) ABSTRACT

Managing a memory element of a memory module, including identifying a PPR listing for the memory element that is stored at a SPD of the memory module; identifying an event associated with a memory address location of the memory element during runtime of the memory module and in response accessing the SPD to write data to the PPR listing indicating the memory address location of the memory element associated with the event; determining whether the PPR listing has available space to store the data indicating the memory address location of the memory element associated with the event; determining that the PPR listing has available space to store the data indicating the memory address location of the memory element associated with the event, and in response, storing the data indicating the memory address location of the memory element associated with the event at the PPR listing at the SPD.

16 Claims, 3 Drawing Sheets

MEMORY REPAIR AT AN INFORMATION HANDLING SYSTEM

BACKGROUND

Field of the Disclosure

The disclosure relates generally to an information handling system, and in particular, memory repair at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing a memory element of a memory module at an information handling system, the method including identifying a post-package repair (PPR) listing for the memory element that is stored at a serial presence detect (SPD) of the memory module; identifying an event associated with a particular memory address location of the memory element during runtime of the memory module; in response to identifying the event, accessing the SPD to write data to the PPR listing indicating the memory address location of the memory element associated with the event; in response to accessing the SPD, determining whether the PPR listing at the SPD has available space to store the data indicating the memory address location of the memory element associated with the event; and determining that the PPR listing at the SPD has available space to store the data indicating the memory address location of the memory element associated with the event, and in response, storing the data indicating the memory address location of the memory element associated with the event at the PPR listing at the SPD.

Other embodiments of these aspects include corresponding systems, apparatus, and computer programs, configured to perform the actions of the methods, encoded on computer storage devices.

These and other embodiments may each optionally include one or more of the following features. For instance, determining that the PPR listing at the SPD does not have available space to store the data indicating the memory address location of the memory element associated with the event, and in response, overwriting an existing entry at the PPR listing at the SPD with data indicating the memory address location of the memory element associated with the event at the PPR listing for the SPD. Overwriting the existing entry at the PPR listing at the SPD with data indicating the memory address location of the memory element associated with the event at the PPR listing for the SPD is based on a priority of the entries at the PPR listing stored at the SPD. Overwriting the existing entry at the PPR listing at the SPD with data indicating the memory address location of the memory element associated with the event at the PPR listing for the SPD, storing the data that was previously stored at the existing entry at an error overflow list. Determining whether the memory module is capable of performing PPR during runtime; and determining that the memory module is capable of performing PPR during runtime, and in response, performing PPR at the memory element based on the PPR listing stored at the SPD at the current runtime. After performing PPR at the memory element based on the PPR listing, performing memory page retirement (MPR) for the data at the previously existing entry. Determining whether the memory module is capable of performing PPR during runtime; and determining that the memory module is not capable of performing PPR during runtime, and in response, performing PPR at the memory element based on the PPR listing stored at the SPD at the next boot of the memory module. After identifying the PPR listing for the memory element that is stored at the SPD of the memory module, the method further comprising: determining whether the PPR listing includes previously existing entries with data indicating other memory address locations of the memory element; and determining that the PPR listing includes previously existing entries with data indicating other memory address locations of the memory element, and in response, performing PPR at the memory element based on the PPR listing that includes the previously existing entries. After identifying the PPR listing for the memory element that is stored at the SPD of the memory module, the method further comprising: determining whether the PPR listing includes previously existing entries with data indicating other memory address locations of the memory element; and determining that the PPR listing does not includes previously existing entries with data indicating other memory address locations of the memory element, and in response, performing a normal boot of the memory module. Disabling a previous PPR listing at the memory module.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
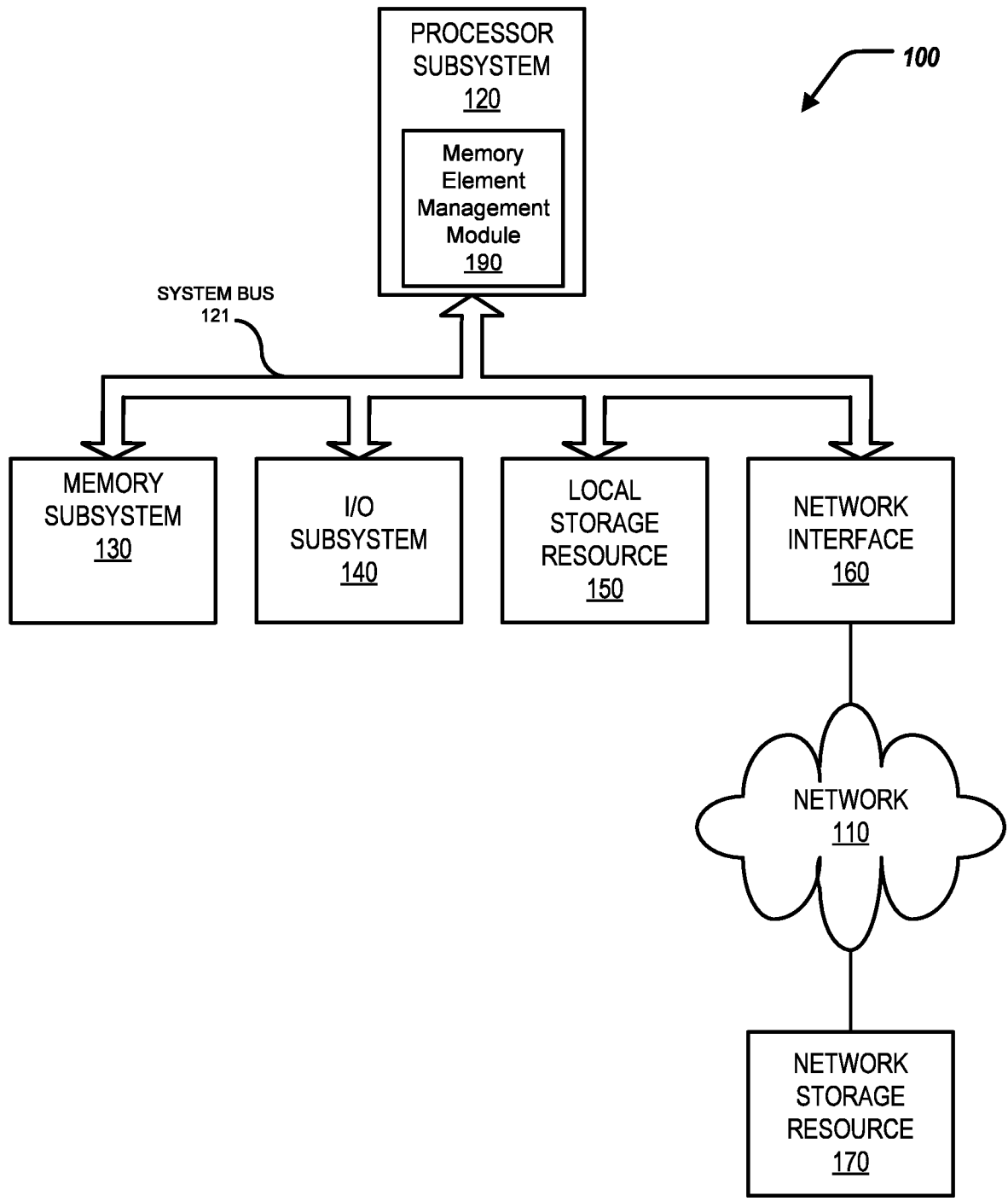
FIG. 1 is a block diagram of selected elements of an embodiment of an information handling system.

This disclosure discusses methods and systems for memory repair at an information handling system. In short, post package repair (PPR) is a method to repair a memory device after it has been packaged. In particular, an event/error can be identified, a memory location of the error logged, and soft PPR can be performed.

Specifically, this disclosure discusses a system and a method for managing a memory element of a memory module at an information handling system, the method comprising: identifying a post-package repair (PPR) listing for the memory element that is stored in a non-volatile storage device such as a serial presence detect (SPD) of the memory module; identifying an event associated with a particular memory address location of the memory element during runtime of the memory module; in response to identifying the event, accessing the SPD to write data to End User space defining a PPR listing indicating the memory address location of the memory element associated with the event; in response to accessing the SPD, determining whether the SPD has available space to store the data indicating the memory address location of the memory element associated with the event; and upon determining that the SPD has available space to store the data indicating the memory address location of the memory element associated with the event, storing the data indicating the memory address location of the memory element associated with the event at the PPR listing in the SPD.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
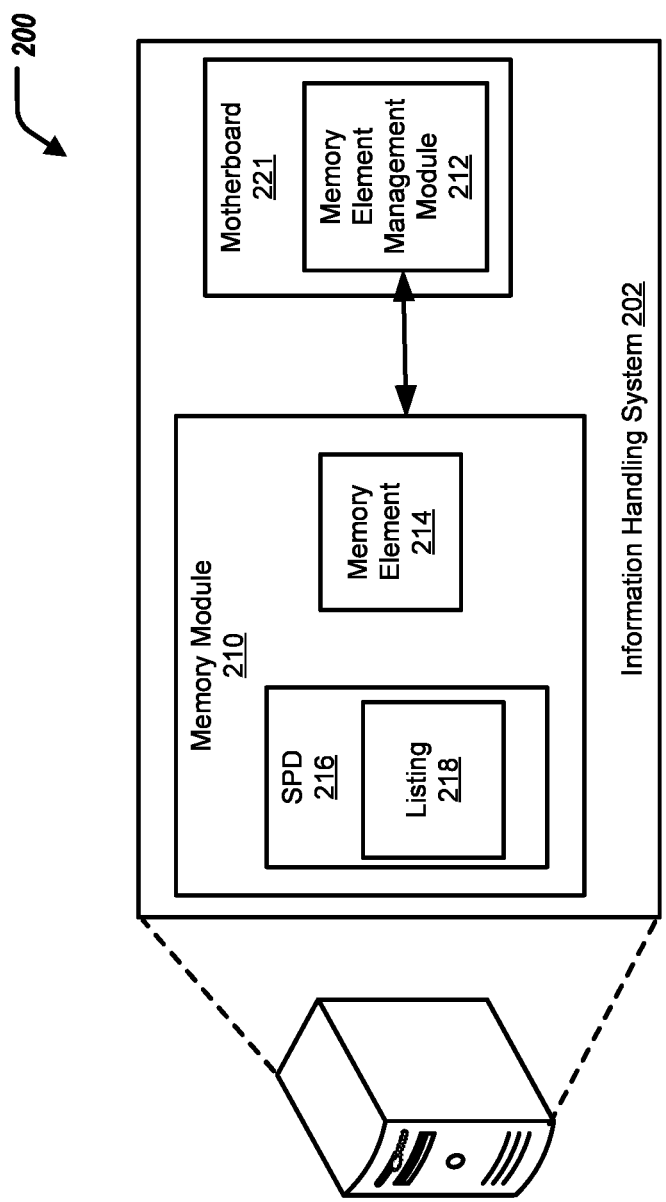
FIG. 2 illustrates a block diagram of an information handling system for repairing memory at the information handling system.
Figure 3:
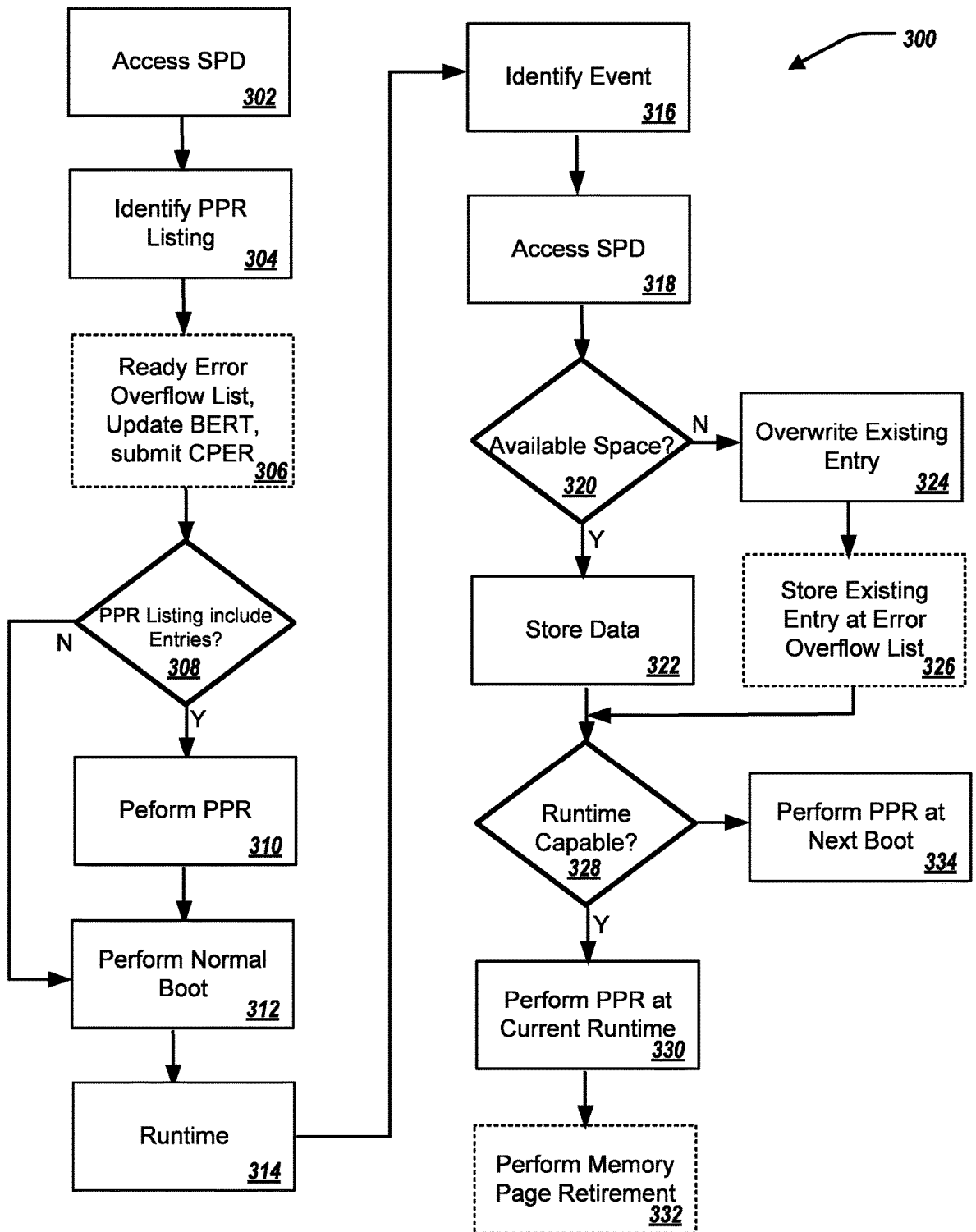
FIG. 3 illustrates a method for memory repair at the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a memory element management module 190. The memory element management module 190 can be included by the processor subsystem 120. In some examples, the memory element management module 190 is or is a component of a central processing unit (CPU), a baseband management controller (BMC), or an embedded controller (EC).

In short, post package repair (PPR) is a method to repair a memory device after it has been packaged. In a first example of PPR, hard PPR (hPPR) is a non-volatile repair feature where the repair is fused into hardware and becomes permanent. For example, with hPPR, when a row of memory is remapped, the remapping is made permanent at the memory device by a process that fuses the remapping. That is, after a power cycle of the memory device, the remapping (that is fused) is maintained during a power cycle. For example, the memory device can be swapped from one information handling system to another, and no further process steps or changes are needed at the another information handling system in regard to the remapping.

In a second example of PPR, soft PPR (sPPR) is a temporary (volatile) repair feature that can be performed during runtime or at power on; however, due to its volatile characteristic, sPPR states are lost when power is removed from the memory device. For example, with sPPR, when a row memory is remapped, the remapping is temporary, only persisting while power is maintained at the memory device. That is, after a power cycle of the memory device, such as during reboot, any remapping (that is not fused by hPPR) are lost. For example, when the memory device is swapped between information handling systems, any re-mappings (e.g., due to failures) must be rediscovered.

To that end, the present disclosure discusses a method and system to identify an event/error, classify the PPR error, log a memory location associated with the error, and perform soft PPR that is persistent across power cycling. As a result, memory re-mappings can be made effectively permanent, while allowing identification of such re-mappings (e.g., for diagnosis).

Turning to FIG. 2, FIG. 2 illustrates an environment 200 including an information handling system 202. The information handling system 202 can include a motherboard 221 and a memory module 210. The motherboard 221 can include a memory element management module 212. The memory module 210 can include a memory element 214 and a serial presence detect (SPD) 216. The SPD 216 can be a non-volatile storage device that includes data associated with the memory module 210, such as a serial number or part number of the memory module; and can further include additional unused memory space.

In some examples, the information handling system 202 is similar to, or includes, the information handling system 100 of FIG. 1. In some examples, the memory element management module 212 is the same, or substantially the same, as the memory element management module 190 of FIG. 1.

The memory element management module 212 can be in communication with the memory module 210. The memory element management module 212 can be included by a central processing unit (CPU), a baseband management controller (BMC), or an embedded controller (EC) of the information handling system 202.

In some examples, the memory module 210 is a double data rate 4 (DDR4) dual in-line memory module (DIMM). In some examples, the memory module 210 is a double data rate 5 (DDR5) dual in-line memory module (DIMM). In some examples, the memory element 214 is a dynamic random-access memory (DRAM).

The SPD 216 can further include/store a post-package repair (PPR) listing 218 for the memory element 214.

FIG. 3 illustrates a flowchart depicting selected elements of an embodiment of a method 300 for memory repair at the information handling system 202. The method 300 may be performed by the information handling system 100, the information handling system 202 and/or the memory element management module 212, and with reference to FIGS. 1-2. It is noted that certain operations described in method 300 may be optional or may be rearranged in different embodiments.

The memory element management module 212 can access the SPD 216 for discovery of the memory module 210, at 302. For example, when the memory module 210 is booted, the memory element management module 212 can access the SPD 216 for initialization and discovery.

The memory element management module 212 can identify the post-package repair (PPR) listing 218 for the memory element 214 that is stored at the serial presence detect (SPD) 216 of the memory module 210, at 304. The memory element management module 212 can, optionally, read an error overflow list, update a boot error record table (BERT), and submit a common platform error records (CPER) for any entries of the initial listing of the PPR listing 218, at 306. That is, the memory element management module 212 can optionally, read the error overflow list from non-volatile random access memory (NVRAM) of a motherboard of the information handling system 202, update the BERT, and submit an UEFI CPER for any entries of the PPR listing 218.

The memory element management module 212 can determine whether the PPR listing 218 includes previously existing entries indicating memory addresses of the memory element 214, at 308. Specifically, the PPR listing 218 can include a listing indicating memory addresses associated with PPR. That is, the PPR listing 218 can include a listing of previously indicted memory addresses that PPR can be performed at or associated with. In other words, the PPR listing 218 can include a listing of memory locations where PPR needs to occur that were previously noted.

In some examples, the memory element management module 212 can determine that the PPR listing 218 includes previously existing entries with data indicating other memory address locations of the memory element 214 (at 308), and in response, perform soft PPR (sPPR) at the memory element 214 based on the PPR listing 218 that includes the previously existing entries, at 310. That is, the memory element management module 212 can perform sPPR at the memory element 214 for the memory addresses indicted by the PPR listing 218.

In some examples, the memory element management module 212 can determine that the PPR listing 218 does not include previously existing entries with data indicating other memory address locations of the memory element 214 (at 308), and in response, perform a normal boot of the memory module 210, at 312. Additionally, after performing PPR at the memory element 214 based on the PPR listing 218 that includes the previously existing entries, at 310, the method can proceed to step 312.

After performing the normal boot of the memory module 210 (at 312), the information handling system 202 is operating normally in runtime, at 314, including reads and writes to the memory element 214 on the memory module 210. For example, during 314, the memory element management module 212 can identify memory locations within the memory element 214 that are causing errors when being accessed and thus, in need of repair with PPR to prevent further errors, at 316. Specifically, the memory element management module 212 identifies an event at the memory element 214 that requires the element to be repaired (event requiring PPR), including identifying a particular memory address location of the memory element 214. The memory element management module 212, in response to identifying the event, accesses the SPD 216 to write data to the PPR listing 218 indicating the memory address location of the memory element 214 associated with the event, at 318. That is, when the event occurs, in response, the memory element management module 212 accesses the SPD 216 to attempt to store data indicating the memory address location of the memory element 214 that is associated with the event.

The memory element management module 212, in response to accessing the SPD 216, determines whether the PPR listing 218 at the SPD 216 has available space to store the data indicating the memory address location of the memory element 214 associated with the event, at 320. For example, the SPD 216 can be limited in space for storing of the PPR listing 218 (e.g., on the order of bytes).

In some examples, the memory element management computing module 212 can determine that the PPR listing 218 at the SPD 216 has available space to store the data indicating the memory address location of the memory element 214 associated with the event (at 320), and in response, store the data indicating the memory address associated with the event at the PPR listing 218 at the SPD 216, at 322. That is, the PPR listing 218 can be updated to include data indicating the memory address associated with the event at the PPR listing 218 at the SPD 216.

In some examples, the memory element management module 212 can determine that the PPR listing 218 at the SPD 216 does not have available space to store the data indicating the memory address location of the memory element 214 associated with the event, (at 320), and in response, overwrite an existing entry at the PPR listing 218 at the SPD 216 with data indicating the memory address location of the memory element 214 with the event at the PPR listing 218 for the SPD 216, at 324. That is, a previously stored (previously exiting) data entry indicating a memory address associated with a previous event can be overwritten at the PPR listing 218 with data indicating the memory address location of the memory element 214 associated with the event at the PPR listing 218 for the SPD 216.

In some examples, the memory element management module 212 can identify the data entry of the PPR listing 218 for overwriting based on a priority of the entries at the PPR listing 218 stored at the SPD 216. That is, the memory element management module 212 can overwrite the existing entry at the PPR listing 218 at the SPD 216 with data indicating the memory address location of the memory element 214 associated with the event at the PPR listing 218 for the SPD 216 based on the priority of the entries at the PPR listing 218. For example, entries having a lower priority within the PPR listing 218 can be identified for overwriting as compared to entries having a higher priority within the PPR listing 218. In some examples, the priority of the entries of the PPR listing 218 is based a correctability of the error associated with the entry. For example, an entry of the PPR listing 218 associated with an uncorrectable error is higher priority than an entry of the PPR listing 218 associated with a correctable error.

In some examples, after overwriting the existing entry at the PPR listing 218 at the SPD 216 with data indicating the memory address location of the memory element 214 with the event at the PPR listing 218 for the SPD 216 (at 324), optionally the memory element management module 212 can store the data that was previously stored at the existing entry at an error overflow list, at 326. That is, the data entry of the PPR listing 218 that is overwritten can be stored at the overflow list stored in non-volatile random access memory (NVRAM) of a motherboard of the information handling system 202.

After storing the data indicating the memory address associated with the event at the PPR listing 218 at the SPD 216 (at 322) or overwriting an existing entry at the PPR listing 218 at the SPD 216 with data indicating the memory address location of the memory element 214 with the event at the PPR listing 218 for the SPD 216 (at 324), the memory element management module 212 can determine whether the memory module 210 is capable of performing soft PPR (sPPR) during runtime, at 328. That is, the memory module 210 and/or the information handling system 202 (e.g., the processor subsystem 120) can be capable of performing sPPR during runtime or not. In some examples, the memory element management module 212 determines that the memory module 210 (and/or the information handling system 202) is capable of performing sPPR during runtime (at 328), and in response, the memory element management module 212 performs sPPR at the memory element 214 based on the PPR listing 218 stored at the SPD 216 at the current runtime, at 330. Performing sPPR at the memory element 214 based on the PPR listing 218 stored at the SPD 216 at the current runtime can include sending a signal to the memory element 214 to indicate a row repair action.

In some examples, after performing sPPR at the memory element 214 based on the PPR listing 218 stored at the SPD 216 at the current runtime (at 330), optionally, the memory element management module 212 provides a command to an operating system (OS) of the information handling system 202 to perform memory page retirement (MPR) for the data at the previously existing entry, at 332. For example, when the existing entry at the PPR listing 218 at the SPD 216 is overwritten with data indicating the memory address location of the memory element 214 with the PPR at the PPR listing 218 for the SPD 216 (at 324), the memory element management module 212 can perform MPR associated with the existing entry at the PPR listing 218 that was overwritten.

In some examples, the memory element management module 212 determines that the memory module 210 (and/or the information handling system 202) is not capable of performing PPR during runtime (at 328), and in response, performs sPPR at the memory element 214 based on the PPR listing 218 stored at the SPD 216 at the next boot of the memory module 210, at 334. Performing PPR at the memory element 214 based on the PPR listing 218 stored at the SPD 216 at the next boot of the memory module 210 and/or the information handling system 202 can include sending a signal to the memory element 214 to indicate a row repair action. In some examples, performing PPR at the memory element 214 can include setting a physical memory address pointer to a spare resource from the particular memory address location of the memory element 214 that is associated with the event.

In some examples, when the memory element management module 212 performs the memory repair of method 300, the memory element management module 212 can further disable (as a diagnostic action) any previous PPR listing to facilitate identifying the memory locations within the memory element 214 that are causing errors when being accessed and thus, in need of repair with PPR to prevent further errors (at 316).

In some examples, if the memory module 210 is transferred between the information handling system 202 and another information handling system, the memory repair of method 300 can continue/resume.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing a memory element of a memory module at an information handling system, the method comprising:
    identifying a post-package repair (PPR) listing for the memory element that is stored at a serial presence detect (SPD) of the memory module;

identifying an event associated with a particular memory address location of the memory element during runtime of the memory module;

in response to identifying the event, accessing the SPD to write data to the PPR listing indicating the memory address location of the memory element associated with the event;

in response to accessing the SPD, determining whether the PPR listing at the SPD has available space to store the data indicating the memory address location of the memory element associated with the event;

determining whether the PPR listing at the SPD has available space to store the data indicating the memory address location of the memory element associated with the event;

when it is determined that the PPR listing at the SPD has available space to store the data indicating the memory address location of the memory element associated with the event, storing the data indicating the memory address location of the memory element associated with the event at the PPR listing at the SPD; and when it is determined that the PPR listing at the SPD does not have available space to store the data indicating the memory address location of the memory element associated with the event, i) overwriting an existing entry at the PPR listing at the SPD with data indicating the memory address location of the memory element associated with the event at the PPR listing for the SPD and ii) after the overwriting, storing data that was previously stored at the existing entry at an error overflow list.

2. The method of claim 1, wherein overwriting the existing entry at the PPR listing at the SPD with data indicating the memory address location of the memory element associated with the event at the PPR listing for the SPD is based on a priority of the entries at the PPR listing stored at the SPD.

3. The method of claim 1, further comprising:
determining whether the memory module is capable of performing PPR during runtime; and
determining that the memory module is capable of performing PPR during runtime, and in response, performing PPR at the memory element based on the PPR listing stored at the SPD at the current runtime.

4. The method of claim 3, after performing PPR at the memory element based on the PPR listing, performing memory page retirement (MPR) for the data at the previously existing entry.

5. The method of claim 1, further comprising:
determining whether the memory module is capable of performing PPR during runtime; and
determining that the memory module is not capable of performing PPR during runtime, and in response, performing PPR at the memory element based on the PPR listing stored at the SPD at the next boot of the memory module.

6. The method of claim 1, after identifying the PPR listing for the memory element that is stored at the SPD of the memory module, the method further comprising:
determining whether the PPR listing includes previously existing entries with data indicating other memory address locations of the memory element; and
determining that the PPR listing includes previously existing entries with data indicating other memory address locations of the memory element, and in response, performing PPR at the memory element based on the PPR listing that includes the previously existing entries.

7. The method of claim 1, after identifying the PPR listing for the memory element that is stored at the SPD of the memory module, the method further comprising:
determining whether the PPR listing includes previously existing entries with data indicating other memory address locations of the memory element; and
determining that the PPR listing does not includes previously existing entries with data indicating other memory address locations of the memory element, and in response, performing a normal boot of the memory module.

8. The method of claim 1, further comprising disabling a previous PPR listing at the memory module.

9. An information handling system comprising a processor having access to memory media storing instructions executable by the processor to perform operations, comprising:
identifying a post-package repair (PPR) listing for a memory element that is stored at a serial presence detect (SPD) of a memory module;
identifying an event associated with a particular memory address location of the memory element during runtime of the memory module;
in response to identifying the event, accessing the SPD to write data to the PPR listing indicating the memory address location of the memory element associated with the event;
in response to accessing the SPD, determining whether the PPR listing at the SPD has available space to store the data indicating the memory address location of the memory element associated with the event;
determining whether the PPR listing at the SPD has available space to store the data indicating the memory address location of the memory element associated with the event;
when it is determined that the PPR listing at the SPD has available space to store the data indicating the memory address location of the memory element associated with the event, storing the data indicating the memory address location of the memory element associated with the event at the PPR listing at the SPD; and
when it is determined that the PPR listing at the SPD does not have available space to store the data indicating the memory address location of the memory element associated with the event, i) overwriting an existing entry at the PPR listing at the SPD with data indicating the memory address location of the memory element associated with the event at the PPR listing for the SPD and ii) after the overwriting, storing data that was previously stored at the existing entry at an error overflow list.

10. The information handling system of claim 9, wherein overwriting the existing entry at the PPR listing at the SPD with data indicating the memory address location of the memory element associated with the event at the PPR listing for the SPD is based on a priority of the entries at the PPR listing stored at the SPD.

11. The information handling system of claim 9, the operations further comprising:
determining whether the memory module is capable of performing PPR during runtime; and
determining that the memory module is capable of performing PPR during runtime, and in response, performing PPR at the memory element based on the PPR listing stored at the SPD at the current runtime.

12. The information handling system of claim 11, after performing PPR at the memory element based on the PPR listing, the operations further comprise performing memory page retirement (MPR) for the data at the previously existing entry.

13. The information handling system of claim 9, the operations further comprising:
    determining whether the memory module is capable of performing PPR during runtime; and
    determining that the memory module is not capable of performing PPR during runtime, and in response, performing PPR at the memory element based on the PPR listing stored at the SPD at the next boot of the memory module.

14. The information handling system of claim 9, after identifying the PPR listing for the memory element that is stored at the SPD of the memory module, the operations further comprising:
    determining whether the PPR listing includes previously existing entries with data indicating other memory address locations of the memory element; and
    determining that the PPR listing includes previously existing entries with data indicating other memory address locations of the memory element, and in response, performing PPR at the memory element based on the PPR listing that includes the previously existing entries.

15. The information handling system of claim 9, after identifying the PPR listing for the memory element that is stored at the SPD of the memory module, the operations further comprising:
    determining whether the PPR listing includes previously existing entries with data indicating other memory address locations of the memory element; and
    determining that the PPR listing does not includes previously existing entries with data indicating other memory address locations of the memory element, and in response, performing a normal boot of the memory module.

16. A non-transitory computer-readable medium storing software comprising instructions executable by one or more computers which, upon such execution, cause the one or more computers to perform operations comprising:
    identifying a post-package repair (PPR) listing for a memory element that is stored at a serial presence detect (SPD) of a memory module;
    identifying an event associated with a particular memory address location of the memory element during runtime of the memory module;
    in response to identifying the event, accessing the SPD to write data to the PPR listing indicating the memory address location of the memory element associated with the event;
    in response to accessing the SPD, determining whether the PPR listing at the SPD has available space to store the data indicating the memory address location of the memory element associated with the event;
    determining whether the PPR listing at the SPD has available space to store the data indicating the memory address location of the memory element associated with the event;
    when it is determined that the PPR listing at the SPD has available space to store the data indicating the memory address location of the memory element associated with the event, storing the data indicating the memory address location of the memory element associated with the event at the PPR listing at the SPD; and
    when it is determined that the PPR listing at the SPD does not have available space to store the data indicating the memory address location of the memory element associated with the event, i) overwriting an existing entry at the PPR listing at the SPD with data indicating the memory address location of the memory element associated with the event at the PPR listing for the SPD and ii) after the overwriting, storing data that was previously stored at the existing entry at an error overflow list.

* * * * *